US007384152B2

(12) United States Patent
Takeuchi

(10) Patent No.: US 7,384,152 B2
(45) Date of Patent: Jun. 10, 2008

(54) LIQUID-COOLED PROJECTOR

(75) Inventor: Katsuyuki Takeuchi, Tokyo (JP)

(73) Assignee: NEC ViewTechnology, Ltd., Tokyo (JP)

( * ) Notice: Subject to any disclaimer, the term of this patent is extended or adjusted under 35 U.S.C. 154(b) by 92 days.

(21) Appl. No.: 11/110,810

(22) Filed: Apr. 21, 2005

(65) Prior Publication Data

US 2005/0236144 A1 Oct. 27, 2005

(30) Foreign Application Priority Data

Apr. 22, 2004 (JP) ............................. 2004-126837

(51) Int. Cl.
*G03B 21/16* (2006.01)
*G03B 21/18* (2006.01)
*G03B 21/26* (2006.01)
*G03B 21/00* (2006.01)

(52) U.S. Cl. ............................. 353/54; 353/60; 353/61; 353/121

(58) Field of Classification Search .................. 353/52, 353/54, 60, 61, 121; 359/237; 362/318; 361/699; 348/748; 128/203.12; 165/104.32; 62/222
See application file for complete search history.

(56) References Cited

U.S. PATENT DOCUMENTS

| 4,787,445 | A * | 11/1988 | Howcroft ............... 165/104.32 |
| 6,166,907 | A * | 12/2000 | Chien .................... 361/699 |
| 6,623,144 | B2 * | 9/2003 | Bornhorst ............... 362/318 |
| 2002/0023448 | A1 * | 2/2002 | Ito et al. ................ 62/222 |
| 2002/0163625 | A1 * | 11/2002 | Tabuchi et al. ........... 353/31 |
| 2002/0191159 | A1 * | 12/2002 | Nagao et al. ............ 353/54 |
| 2004/0250814 | A1 * | 12/2004 | Post et al. ............. 128/203.12 |
| 2005/0117077 | A1 * | 6/2005 | Utsunomiya ............... 349/5 |
| 2005/0185244 | A1 * | 8/2005 | Fujimori et al. .......... 359/237 |

FOREIGN PATENT DOCUMENTS

JP 60-092890 5/1985

(Continued)

OTHER PUBLICATIONS

"Merriam-Webster's Collegiate Dictionary", Tenth Edition, copyright 2001, p. 623.*

(Continued)

*Primary Examiner*—Melissa Jan Koval
(74) *Attorney, Agent, or Firm*—McGinn IP Law Group, PLLC

(57) ABSTRACT

A liquid-cooled projector incorporating cooling a component that to be cooled by a cooling liquid, and moreover, can constantly maintain the temperature of the component to be cooled at a prescribed temperature or below. A liquid-cooling jacket for cooling either one or both of the optical modulation element and cold mirror, which are the components that are to be cooled, one or a plurality of radiators, one or a plurality of reserve tanks, and one or a plurality of circulation pumps are connected together by piping. The components that are to be cooled are maintained at or below the prescribed temperature by circulating the cooling liquid through the system, which can further be separated at any position by couplers. By collecting the air that is generated in the cooling system in the reserve tank, idle running of the circulation pump can be prevented, and the effect of expansion and shrinkage in the volume of the cooling liquid can be mitigated.

19 Claims, 2 Drawing Sheets

FOREIGN PATENT DOCUMENTS

| | | |
|---|---|---|
| JP | 01-265226 | 10/1989 |
| JP | 05-265601 | 10/1993 |
| JP | 11-282361 | 10/1999 |
| JP | 2000-077585 | 3/2000 |
| JP | 2003-176873 | 6/2003 |
| JP | 2004-038105 | 2/2004 |
| JP | 2004-077883 | 3/2004 |
| JP | 2005-227353 | 8/2005 |
| WO | WO 02/19027 | 3/2002 |

OTHER PUBLICATIONS

Japanese Office Action dated Aug. 8, 2007 (with English translation).

* cited by examiner

LIQUID-COOLED PROJECTOR

BACKGROUND OF THE INVENTION

1. Field of the Invention

The present invention relates to a projector that incorporates a mechanism for a component that is to be cooled by a coolant.

2. Description of the Related Art

Cooling the heat-generating parts within a projector is crucial for extending the life of constituent components and improving the reliability of the projector. In particular, the optical modulation element and cold mirror must be cooled to below a prescribed temperature. For this purpose, a method has been disclosed in Japanese Patent Laid-Open Publication No. 2004-77883 in which a heat sink having heat-radiation fins is directly attached to the optical modulation element and this heat sink is then air-cooled by means of an air-cooling fan. Japanese Patent Laid-Open Publication No. 2000-77585 discloses a configuration in which a Peltier element is interposed between optical elements and thin heat sink is then air-cooled by means of an air-cooling fan. The cold mirror is also air-cooled by arranging a heat sink on the rear surface to absorb infrared rays and then cooling this heat sink by means of an air-cooling fan. However, the demand for higher luminance in recent years has resulted in the use of lamps with higher power, and this has resulted in the generation of even more heat in the optical modulation element and cold mirror. This change has necessitated larger air-cooling fans for air-cooled designs, with the attendant disadvantage of increased noise. Alternatively, Japanese Patent Laid-Open Publication No. H11-282361 discloses an image display device in which cooling is realized by providing a circulator and then circulating a cooling medium through a cooling container that is formed as a single unit with a heat generator such as a reflector.

As described above, the necessity for a larger air-cooling fan when air-cooling is used in a high-luminance projector and the problem of the attendant increase in noise is a common problem. On the other hand, the cooling method that employs a cooling medium that is disclosed in Japanese Patent Laid-Open Publication No. H11-282361 does not disclose any countermeasures for the changes in the expansion in the volume of the cooling liquid that are caused by temperature changes along the circulation route.

SUMMARY OF THE INVENTION

It is an object of the present invention to provide a liquid-cooled projector that incorporates a means for cooling a component that is to be cooled by a cooling liquid, and moreover, for constantly maintaining the component that is to be cooled at or below a prescribed temperature.

The liquid-cooled projector of the present invention is provided with a liquid-cooling unit inside the projector that includes: a liquid-cooling jacket that is provided for a component that is to be cooled of the projector; a circulation pump for circulating the cooling liquid; a radiator for cooling the cooling liquid that has risen in temperature; a reserve tank for holding a prescribed amount of the cooling liquid that is circulated; and piping for connecting the liquid-cooling jacket, the circulation pump, the radiator, and the reserve tank.

A gas layer is preferably provided in the reserve tank for absorbing expansion in the volume of the cooling liquid. In addition, when replenishing cooling liquid that passes by way of a cooling liquid injection port, the cooling liquid injection port is preferably in contact with the gas layer. Further, an inflow nozzle and outflow nozzle for cooling liquid are preferably provided in the reserve tank, and the openings of the nozzle tips preferably extend to the central portion of the reserve tank such that when at least a prescribed amount of the cooling liquid is held in the reserve tank, the openings of the nozzle tips are in contact with the cooling liquid inside the reserve tank.

The reserve tank preferably includes a liquid level verification part that allows verification of the amount of cooling liquid, and this liquid level verification part may be provided directly on the surface of the reserve tank, or may be provided as a liquid level display part that is connected to the reserve tank.

The radiator may be formed as a single unit with the reserve tank. Alternatively, the couplers may be provided at a prescribed position in the piping and that allow connection and removal. A plurality of each of couplers, circulation pumps, and radiators may be provided.

The present invention has a configuration in which: a liquid-cooling jacket that is provided on an optical modulation element or a cold mirror that is a component that is to be cooled inside a projector, one or a plurality of radiators, one or a plurality of reserve tanks, and one or a plurality of circulation pumps are connected together by piping; cooling liquid is circulated in the cooling system that can be separated at any position by means of couplers that are provided in the piping, whereby the component that is to be cooled inside the projector are maintained at or below a prescribed temperature; and gas within the cooling system is collected in the reserve tank.

The present invention features a configuration in which the liquid-cooling unit allows cooling of a component that is to be cooled inside a projector by a cooling liquid, and moreover, that allows stable and continuous circulation of the cooling liquid. The present invention thus has the effect of allowing the component that is to be cooled inside the projector to be maintained at or below a prescribed temperature and of enabling a solution to the problems of large size and increased noise of the fan in an air-cooled system.

The above and other objects, features, and advantages of the present invention will become apparent from the following description with reference to the accompanying drawings, which illustrate examples of the present invention.

DETAILED DESCRIPTION OF THE PREFERRED EMBODIMENTS

The liquid-cooled projector of the present invention includes on the main body of the projector a liquid-cooling unit in which constituent elements can be removed. The liquid-cooling unit constitutes a cooling system that includes a liquid-cooling jacket, one or a plurality of radiators, one or a plurality of reserve tanks, and one or a plurality of circulation pumps that are linked together by piping. The liquid-cooling jacket cools at least one of an optical modulation element and a cold mirror, which are the components that are to be cooled inside the projector, by means of cooling liquid that is circulated inside the liquid-cooling jacket.

By means of the circulation of cooling liquid inside this cooling system, the radiators cool the cooling liquid that has been heated by the components that are to be cooled, and the components that are to be cooled are thus maintained at or below a prescribed temperature. The reserve tank holds an air layer that is sufficient for absorbing expansion in the volume of the cooling liquid that is caused by change in the ambient temperature or the rise in the temperature of the cooling liquid itself, and moreover, holds an amount of cooling liquid that is sufficient for coping with the evaporation of water from, for example, the connectors of each of the components. A projector is installed in a variety of positions depending on the conditions of use, but the above-described configuration of the cooling system can prevent idle running of the circulation pump because bubbles that are generated within the connected cooling liquid system remain inside the reserve tank. The stable and continuous circulation of the cooling liquid can thus be maintained.

In addition, the present invention has a configuration that includes a display part that allows determination of whether the capacity of cooling liquid of the entire cooling system is adequate and that allows replenishment when the capacity of the cooling liquid is not adequate. Still further, two or more couplers that allow connection and removal are provided in the cooling system that includes the liquid-cooling jacket. These couplers facilitate the replenishment of the cooling liquid of the cooling system, the verification of the capacity of the cooling liquid, and the exchange of malfunctioning parts when fabricating and performing maintenance of the projector.

WORKING EXAMPLE 1

Figure 1:
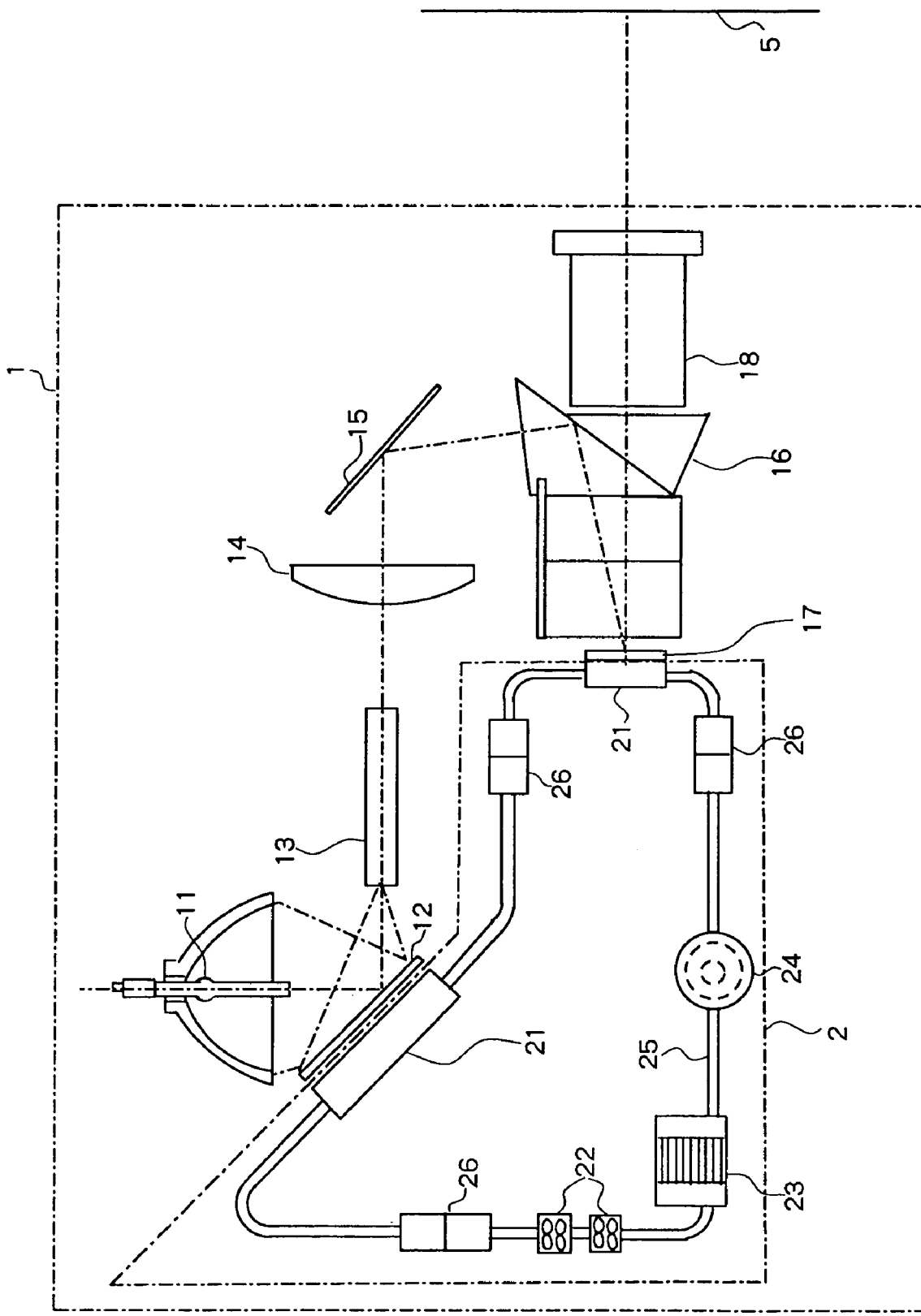
FIG. 1 is a schematic view of the configuration of a working example of a liquid-cooled projector that is provided with the liquid-cooling unit of the present invention.

Explanation next regards the first working example of the liquid-cooled projector that is provided with the liquid-cooling unit of the present invention with reference to the accompanying figures. As shown in FIG. 1, projector 1 of the present working example is provided with: light source 11, which is a lamp provided with a reflecting mirror; cold mirror 12 for eliminating from the illumination system the infrared rays in the light beam that is emitted from light source 11; rod integrator 13 for producing a plurality of light source images; relay lens 14 and reflecting mirror 15 for directing light to optical modulation element 17; prism 16 for realizing color separation and combination; optical modulation element 17, projection lens 18 for projecting light on screen 5; and liquid-cooling unit 2 for cooling optical modulation element 17 and cold mirror 12.

Liquid-cooling unit 2 is provided with: liquid-cooling jacket 21 that is arranged on the rear of optical modulation element 17 and cold mirror 12 for absorbing heat from these components that are to be cooled by means of a cooling liquid; circulation pump 22 for circulating the cooling liquid within the cooling system; radiator 23 for discharging heat of the cooling liquid and cooling from the outside; reserve tank 24 for storing and circulating cooling liquid; piping 25 for connecting liquid-cooling jacket 21, circulation pump 22, radiator 23, and reserve tank 24; and couplers 26 that are fitted at any location of piping 25.

This liquid-cooling unit 2 causes circulation that absorbs heat in liquid-cooling jacket 21 that is generated from cold mirror 12 and optical modulation element 17; under the pressure of circulation pump 22, passes cooling liquid through liquid-cooling jacket 21 to absorb heat; cools the cooling liquid that has risen in temperature by means of radiator 23; and again directs the cooling liquid toward liquid-cooling jacket 21 by way of reserve tank 24.

In reserve tank 24, an air layer is maintained for coping with the expansion and shrinkage of the volume of the cooling liquid of the entire system that is attendant to changes in the temperature of the cooling liquid and the evaporation of water of the cooling liquid. In addition, reserve tank 24 is configured to capture and confine bubbles that are generated in the entire system such that the bubbles are not recirculated.

In the present working example 1 that is shown in FIG. 1, liquid-cooling jacket 21 of optical modulation element 17 that is a component that are to be cooled and liquid-cooling jacket 21 of cold mirror 12 that are to be cooled are linked in a series in the cooling system. Two circulation pumps 22, one radiator 23, and one reserve tank 24 are also connected in a series. The numbers and order of arrangement of the components that are to be cooled, circulation pumps, radiator, and reserve tank, as well as the choice of serial or parallel arrangement, can be freely selected according to the conditions of use and are not limited to the present working example. In addition, a reserve tank and a radiator can be formed as a single unit by providing a radiator plate on the outer surface of the reserve tank. Further, the number of couplers and the locations where they should be attached can be freely selected, and even if couplers are not provided, the basic functions of liquid-cooling unit 2 will not be affected. In the present working example 1, the components that are to be cooled are represented by optical modulation element 17 and cold mirror 12. However, the components that are to be cooled are not limited to these two components, and it can be easily inferred that the present invention can be applied to a heat-generating body inside the projector that is not shown in the figure. The image formation components are not limited to optical modulation element 17.

WORKING EXAMPLE 2

Figure 2:
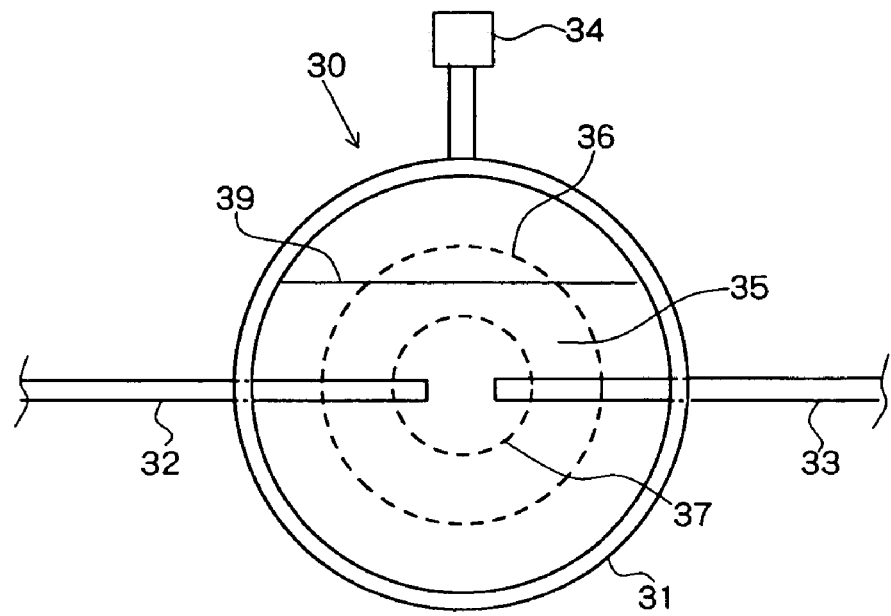
FIG. 2 shows a schematic sectional view of a working example of the reserve tank of the present invention.

Reserve tank 24 can be conceived in a variety of forms, and working example 2 shows one working example of the reserve tank. As shown in FIG. 2, in reserve tank 30 of this working example, tank 31 is spherical, and this spherical tank 31 is provided with inflow nozzle 32, outflow nozzle 33, and injection port 34. Maximum liquid level mark 36 and minimum liquid level mark 37 are provided on liquid amount display part 35 that can be observed and that is provided on tank 31 itself. Inflow nozzle 32 and outflow nozzle 33 have open ends that are more centrally located than minimum liquid level mark 37. Thus, even when bubbles are generated and circulate inside this liquid-cooling unit 2, the bubbles combine with the air layer that is above liquid level 39 inside reserve tank 30. Outflow nozzle 33 is similarly positioned more centrally than minimum liquid level mark 37, whereby only the cooling liquid that has no bubbles is caused to flow from reserve tank 30, whereby idle running of circulation pump 22 can be prevented and stable and continuous circulation of the cooling liquid can be provided. Maximum liquid level mark 36 indicates the amount of air that is necessary for maintaining an air layer that is adequate for coping with the expansion in volume that is caused by the rise in the temperature of the cooling liquid that is in this cooling liquid circulation system. Minimum liquid level mark 37 indicates the amount of liquid that allows the openings of inflow nozzle 32 and outflow nozzle 33 to be submerged in the cooling liquid.

Injection port 34 is a supply port for replenishing cooling liquid when liquid level 39 of cooling liquid inside the cooling liquid circulation system has fallen below minimum liquid level mark 37 due to, for example, evaporation. When replenishing cooling liquid from injection port 34, an amount of liquid that is less than or equal to maximum liquid level mark 36 can be realized by means of liquid amount display part 35. As described in the foregoing explanation, bubbles inside the cooling liquid circulation system can be collected in the air layer in the upper portion of reserve tank 30 such that the cooling liquid that is circulated does not contain bubbles. In addition, although reserve tank 30 is ideally a sphere, if the direction of installation of projector 1 is fixed by the limits on the state in which projector 1 can be set up (for example, by limits on the direction of the lamp), it can easily be inferred that the desired functions can be achieved even if reserve tank 30 is a cylinder that takes as its center the axis of the direction of the fixed installation. It can be easily inferred that projector 1 will have the above-described functions if inflow nozzle 32 and outflow nozzle 33 are formed as a single unit and are provided with openings that are more centrally located than minimum mark 37.

WORKING EXAMPLE 3

Figure 3:
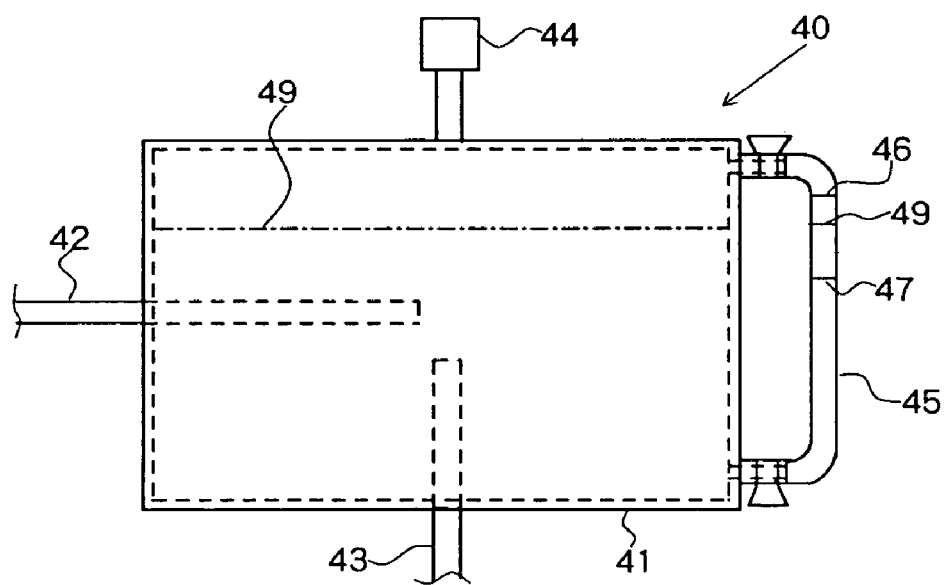
FIG. 3 shows a schematic sectional view of another working example of the reserve tank of the present invention.

Working example 3 shows another working example of the reserve tank. Reserve tank 40 of the present working example shown in FIG. 3 is a working example for a case in which liquid level display part 45, can be observed but cannot be directly shown on tank 41, which is the cooling liquid storage unit of reserve tank 40. Liquid level display part 45 is a pipe that allows observation of its interior; maximum liquid level mark 46 and minimum liquid level mark 47 are shown on this pipe. When the liquid level is checked, the orientation of reserve tank 40 is arranged with injection port 44 at the upper side such that injection port 44 is in contact with the air layer.

While preferred embodiments of the present invention have been described using specific terms, such description is for illustrative purposes only, and it is to be understood that changes and variations may be made without departing from the spirit or scope of the following claims. For example, other gases such as a nitrogen gas etc. can be used in the reserve tank in the embodiments.

What is claimed is:

1. A liquid-cooled projector for forming and projecting an image upon a screen, an interior of said projector being equipped with a liquid-cooling unit comprising:
    a liquid-cooling jacket provided for a component of said projector that is to be cooled;
    a circulation pump for circulating a cooling liquid;
    a radiator for cooling said cooling liquid that has risen in a temperature;
    a reserve tank for holding a prescribed amount of said cooling liquid that is circulated; and
    piping for connecting said liquid-cooling jacket, said circulation pump, said radiator, and said reserve tank,
    wherein tips of an inflow nozzle and outflow nozzle for cooling liquid provided in said reserve tank extend to a central portion of the reserve tank such that when at least a prescribed amount of said cooling liquid is held in said reserve tank, openings of the nozzle tips are in contact with the cooling liciuid inside the reserve tank.

2. A liquid-cooled projector according to claim 1, wherein a gas layer is provided in said reserve tank for absorbing an expansion in volume of said cooling liquid.

3. A liquid-cooled projector according to claim 2, wherein said reserve tank is provided with a cooling liquid injection port that stays in contact with said gas layer when said cooling liquid is replenished.

4. A liquid-cooled projector according to claim 1, wherein said reserve tank includes a liquid level verification part that allows verification of an amount of said cooling liquid.

5. A liquid-cooled projector according to claim 4, wherein said liquid level verification part is provided directly on a surface of said reserve tank.

6. A liquid-cooled projector according to claim 4, wherein said liquid level verification part is provided as a liquid level display part that is connected to said reserve tank.

7. A liquid-cooled projector according to claim 1, wherein said radiator is formed as a single unit with said reserve tank.

8. A liquid-cooled projector according to claim 1, wherein a coupler that allows connection and removal is provided at a prescribed position in said piping.

9. A liquid-cooled projector according to claim 8, wherein a plurality of said couplers is provided.

10. A liquid-cooled projector according to claim 1, wherein a plurality of said circulation pumps is provided.

11. A liquid-cooled projector according to claim 1, wherein a plurality of said radiators is provided.

12. A method of cooling an image projector, said method comprising:
    providing at least one component of said image projector with a liquid-cooling jacket; and
    circulating a cooling liquid through a circulation route of a cooling system having at least one radiator to dissipate heat from said at least one component provided with said liquid-cooling jacket,
    wherein said circulation route of said cooling system includes at least one reserve tank for holding a prescribed amount of said cooling liquid being circulated and allowing an expansion of said cooling liquid as a temperature of said cooling liquid increases.
    wherein tips of an inflow nozzle and outflow nozzle for cooling liquid provided in said reserve tank extend to a central portion of the reserve tank such that when at least a prescribed amount of said cooling liquid is held in said reserve tank, openings of the nozzle tips are in contact with the cooling liciuid inside the reserve tank.

13. The method of claim 12, further comprising:
    providing a gas layer in said at least one reserve tank to absorb said cooling liquid expansion.

14. The method of claim 12, wherein at least one of said at least one radiator is integrated into a structure of said at least one reserve tank.

15. The method of claim 13, further comprising:
    providing an indication of a level of said cooling liquid in at least one of said at least one reserve tank.

16. A liquid-cooling system for an image projector, said liquid-cooling unit comprising:
    a liquid-cooling jacket for at least one component of said image projector; and
    a circulation route for circulating a cooling liquid through said liquid-cooling jacket, said circulation route having at least one radiator to dissipate heat from said at least one component,
    wherein said circulation route includes at least one reserve tank for holding a prescribed amount of said cooling liquid being circulated and for allowing for an expansion of said cooling liquid as a temperature of said cooling liquid increases.

wherein tips of an inflow nozzle and outflow nozzle for cooling liquid provided in said reserve tank extend to a central portion of the reserve tank such that when at least a prescribed amount of said cooling liquid is held in said reserve tank, openings of the nozzle tips are in contact with the cooling liquid inside the reserve tank.

17. The liquid-cooling system of claim 16, wherein said at least one reserve tank has a gas layer to absorb said cooling liquid expansion.

18. The liquid-cooling system of claim 16, wherein at least one of said at least one radiator is integral to a structure of one of said at least one reserve tank.

19. The liquid-cooling system of claim 16, further comprising:

a cooling liquid level indicator on said at least one reserve tank.

* * * * *